(12) United States Patent
Tai

(10) Patent No.: US 8,642,503 B1
(45) Date of Patent: Feb. 4, 2014

(54) SUPERHYDROPHOBIC AND SUPEROLEOPHILIC COMPOSITE

(71) Applicant: National Tsing Hua University, Hsinchu (TW)

(72) Inventor: Nyan-Hwa Tai, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 13/751,730

(22) Filed: Jan. 28, 2013

(30) Foreign Application Priority Data

Aug. 24, 2012 (TW) .............................. 101130755 A

(51) Int. Cl.
*B01J 20/26* (2006.01)
(52) U.S. Cl.
USPC ........................................................ 502/402
(58) Field of Classification Search
USPC ........... 210/671, 242.4, 694, 269, 924, 502.1, 210/263, 675, 780, 505; 502/402
See application file for complete search history.

(56) References Cited

U.S. PATENT DOCUMENTS

2012/0031846 A1   2/2012   Lin et al.

OTHER PUBLICATIONS

Duc Dung Nguyen, Nyan-Hwa Tai, San-Boh Lee and Wen-Shyong Kuo, "Superhydrophobic and superoleophilic properties of graphene-based sponges fabricated using a facile dip coating method" May 3, 2012, Energy Environ. Sci., 2012, 5, 7908-7912.*

* cited by examiner

*Primary Examiner* — Colleen Dunn
*Assistant Examiner* — Haytham Soliman
(74) *Attorney, Agent, or Firm* — Muncy, Geissler, Olds & Lowe, PLLC

(57) ABSTRACT

A superhydrophobic and superoleophilic composite comprises a porous material and a surface layer. The porous material includes a framework and a plurality of interconnecting pores formed inside the framework and interconnecting with each other. The framework has a plurality of skeletons connected with each other. The surface layer is coated on the surfaces of the skeletons and includes an adhesion medium and a plurality of graphene sheets stuck to the surfaces of the skeletons by the adhesion medium. The graphene sheets form a rough surface conforming to the skeletons. The superhydrophobic and superoleophilic composite can absorb oil or organic pollutants in water and can be reused.

10 Claims, 11 Drawing Sheets

SUPERHYDROPHOBIC AND SUPEROLEOPHILIC COMPOSITE

FIELD OF THE INVENTION

The present invention relates to a composite, particularly to a superhydrophobic and superoleophilic composite.

BACKGROUND OF THE INVENTION

Petroleum and petrochemical industries provide energy and required products for human beings, but they also cause environmental pollution.

For example, oil leakage by oceanic petroleum exploitation, oil spill from wrecked oil tankers, and malicious disposal of waste oil have seriously endangered environment and ecology. Normally, the abovementioned oil pollutions are removed with oil absorbents or oil scavengers. Then, the collected oil is treated with bioreagents. However, the abovementioned method is complicated and expensive. U.S. Pat. Pub. No. 2012/0031846 disclosed a method for collecting oil with modified clay, wherein oil is absorbed by modified clay, and wherein an oleophilic polymeric compound is intercalated into laminate structures of silicate clay, mica, or talc to expand the interlayer space for absorbing more oil.

However, the abovementioned modified clay is difficult to recycle. Besides, the weight ratio of the absorbed oil to the modified clay is only about 20 for the modified clay used in the first time. Therefore, there is still room to improve the oil absorbing capacity for achieving better treatment on oil pollution.

SUMMARY OF THE INVENTION

The primary objective of the present invention is to solve the problems that the modified clay of the conventional technology is difficult to recycle and has a low weight ratio of absorbed oil to clay.

To achieve the abovementioned objective, the present invention proposes a superhydrophobic and superoleophilic composite which comprises a porous material and a surface layer. The porous material includes a framework and a plurality of interconnecting pores formed inside the framework and interconnecting with each other. The framework has a plurality of skeletons connected with each other and separated by the interconnecting pores. The surface layer is coated on the surface of the skeletons, which includes an adhesion medium and a plurality of graphene sheets stuck to the surface of the skeletons by the adhesion medium.

In one embodiment, the graphene sheets conform to the surface of the skeletons and form a rough surface.

Via the surface layer coated on the surface of the skeletons of the porous material, the composite of the present invention has the advantages:

1. Because the composite of the present invention not only has superoleophilicity but also has superhydrophobicity, it can absorb oil and organic pollutants in water.
2. After having absorbed oil or organic pollutants, the composite can be reused via squeezing-twisting, distillation, or centrifugal method to expel the pollutants.
3. The weight ratio of the absorbed oil/organic pollutant to the composite is greater than 50.

DETAILED DESCRIPTION OF THE PREFERRED EMBODIMENTS

The technical contents of the present invention are described in detail in cooperation with the drawings below.

Figure 1:
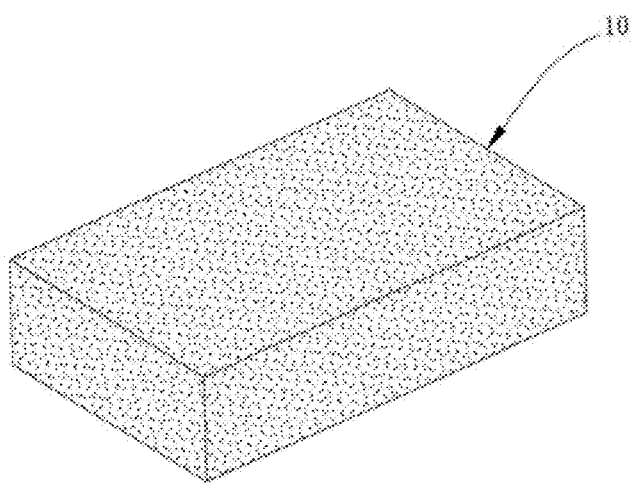
FIG. 1 is a perspective view schematically showing an appearance of a superhydrophobic and superoleophilic composite according to one embodiment of the present invention.
Figure 2A:
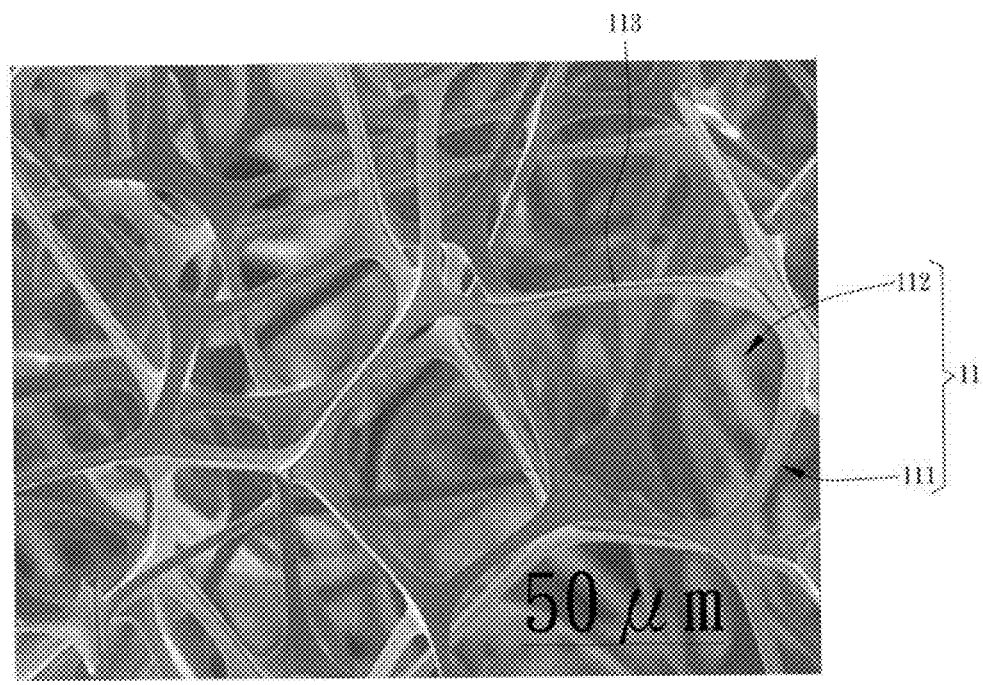
FIG. 2A is an SEM image of a porous material according to one embodiment of the present invention.
Figure 2B:
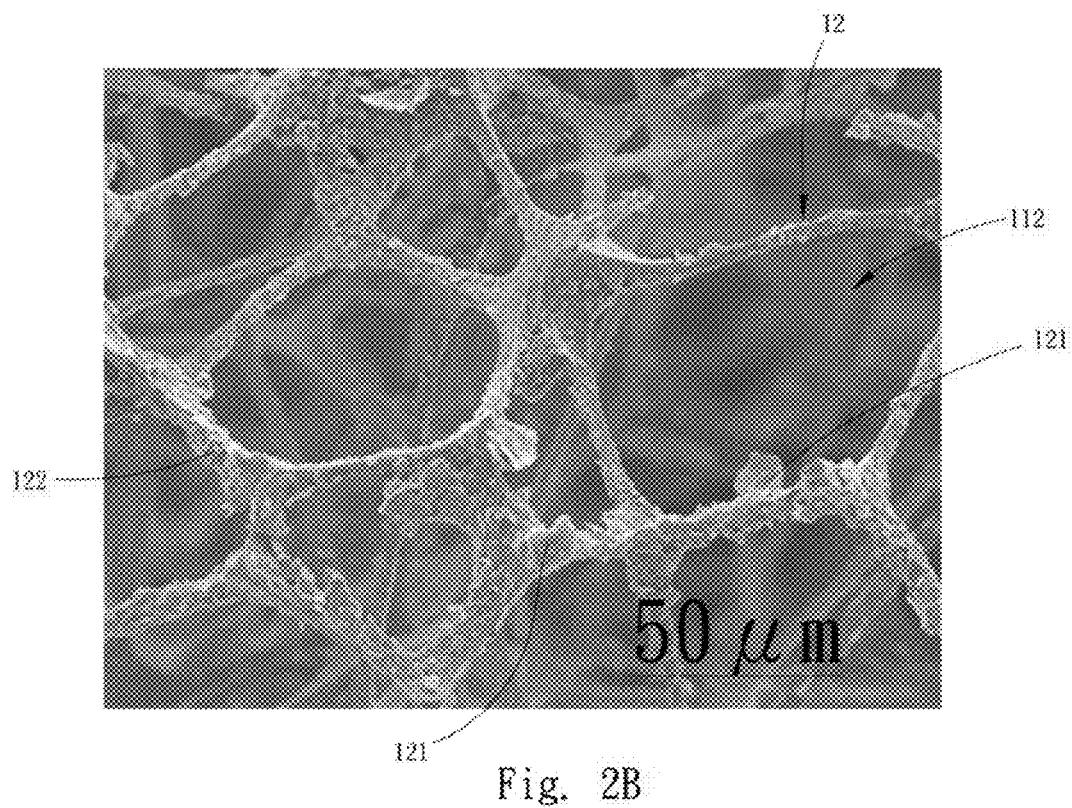
FIG. 2B is an SEM image of a porous material coated with graphene sheets according to one embodiment of the present invention.
Figure 2C:
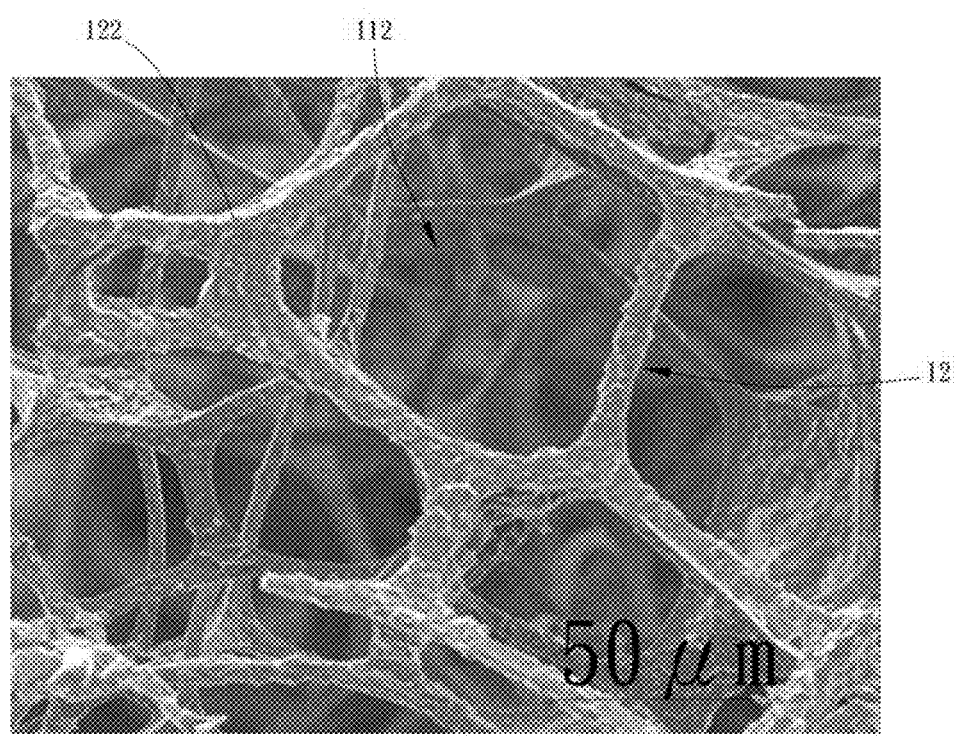
FIG. 2C is an SEM image showing that graphene sheets are stuck to skeletons by an adhesion medium according to one embodiment of the present invention.

Refer to FIG. 1 and FIGS. 2A-2C. FIG. 1 is a perspective view schematically showing an appearance of a superhydrophobic and superoleophilic composite according to one embodiment of the present invention. FIGS. 2A-2C are SEM (Scanning Electron Microscope) images of a porous material, the porous material coated with graphene sheets, and the porous material coated with graphene sheets and an adhesion medium according to one embodiment of the present invention. The present invention proposes a superhydrophobic and superoleophilic composite 10, which comprises a porous material 11 and a surface layer 12. The porous material 11 has a porous structure made of a polymeric, metallic or ceramic material. In a preferred embodiment, the porous material 11 is made of a polymeric material and has a sponge-like structure, such as a sponge. The raw material of the porous material 11 may be selected from a group consisting of lignocellulose, cellulose, foamed polymers, polyether, polyvinyl alcohol, melamine, polyurethane, and polyester. The porous material 11 includes a framework 111 and a plurality of interconnecting pores 112 formed inside the framework 111 and interconnecting with each other. The framework 111 has a plurality of skeletons 113 connected with each other and separated by the interconnecting pores 112. The interconnecting pores 112 may have but are not limited to have a diameter of 50-200 μm.

Figure 3:
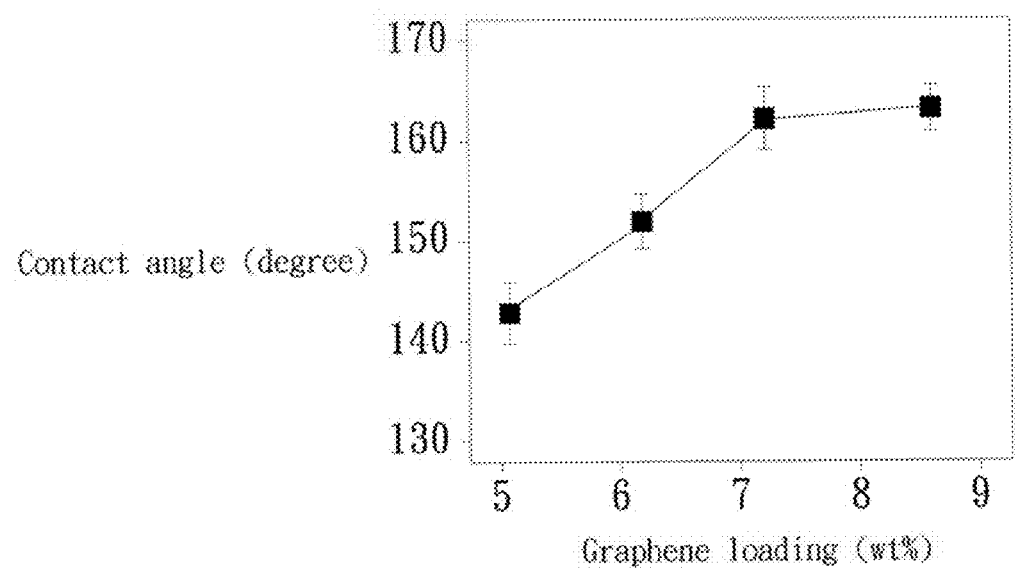
FIG. 3 shows a relationship between the composite-water contact angle and the weight ratio of graphene sheets to the porous material according to one embodiment of the present invention.

The surface layer 12 is coated on the surface of the skeletons 113 and includes a plurality of graphene sheets 121. The graphene sheets 121 are adhered on the surface of the skeletons 113 for forming a rough surface 122 conforming to the skeletons 113. In one embodiment, the graphene sheets 121 have a thickness of 0.5-5.0 nm. The weight of the graphene sheets 121 is 5-10% of the weight of the porous material 11. In a preferred embodiment, the weight of the graphene sheets 121 is 7.3% of the weight of the porous material 11. The rough surface 122 performs as a lotus leaf and has a hydrophobic behavior. Refer to FIG. 3 showing a relationship between the composite-water contact angle and the weight ratio of graphene sheets to the porous material. While the weight ratio is smaller than 5.0%, the composite 10 would absorb water fast as soon as it contacts water. With increase of the weight ratio, the contact angle increases from 140 degrees to 160 degrees. It indicates that the hydrophobicity increases with the weight ratio. While the weight ratio reaches 7.3%, the contact angle may reach 160-170 degrees.

The steps for fabricating the superhydrophobic and superoleophilic composite 10 are described below. First, purchase a porous material 11 from commercial and ultrasonically clean the porous material 11 using distilled water and acetone sequentially. Next, dry the porous material 11 in a vacuum chamber at a temperature of 100° C. for several hours until water and acetone are completely removed, as shown in FIG. 2A. Next, soak the porous material 11 in alcohol containing a plurality of graphene sheets, wherein a single graphene sheet has a lateral size of about 0.15-10.0 μm and a thickness of 0.5-5.0 nm. The graphene sheets could be stripped from the graphite according to a paper "D. D. Nguyen, N. H. Tai, Y. L. Chueh, S. Y. Chen, Y. J. Chen, W. S. Kuo, T. W. Chou, C. S. Hsu and L. J. Chen, Nanotechnology, 2011, 22, 295606". However, the present invention does not constrain the method for obtaining graphene sheets.

Next, bake the porous material 11 containing the graphene sheets in a vacuum chamber at a temperature of 100° C. for 2 hours. Thereby, the van der Walls force makes the graphene sheets adhere to and wrap the surface of the skeletons 113 such that the graphene sheets 121 and the rough surface 122 are formed, as shown in FIG. 2B. Next, soak the porous material 11 containing the graphene sheets 121 in a xylene solution of PDMS (Polydimethylsiloxane), whereby PDMS penetrates the gaps between the graphene sheets 121 and the skeletons 111. Next, bake the porous material 11 at a temperature of 120° C. for several hours to form the adhesion medium securely bonding the graphene sheets 121 to the skeletons 113, as shown in FIG. 2C. However, the present invention does not constrain that the adhesion medium must be made of PDMS. In fact, the adhesion medium may be made of any adhesive and oleophilic polymeric material. The adhesion medium may be made of a material selected from a group consisting of PDMS, Teflon, sulfonated polystyrene, nafion, polystyrene, PE (polyethylene), PP (polypropylene), FEP (fluorinated ethylene propylene), PIB (polyisobutylene), PtBMA (poly t-butyl methacrylate), and a mixture of them.

Figure 4A:
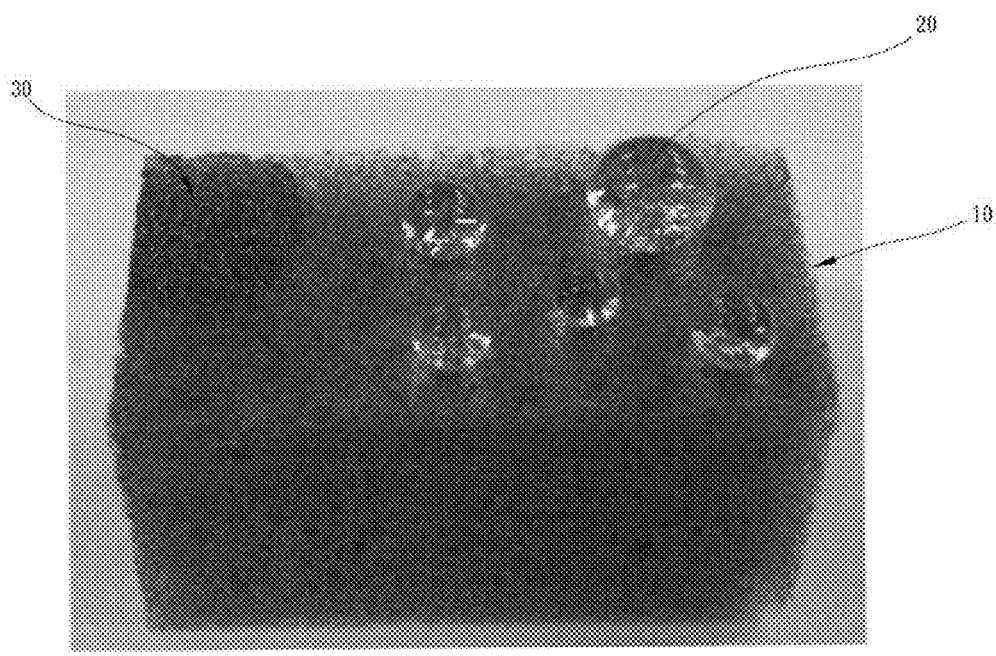
FIG. 4A shows that water droplets are on the composite surface and motor oil permeates into the composite according to one embodiment of the present invention.
Figure 4B:
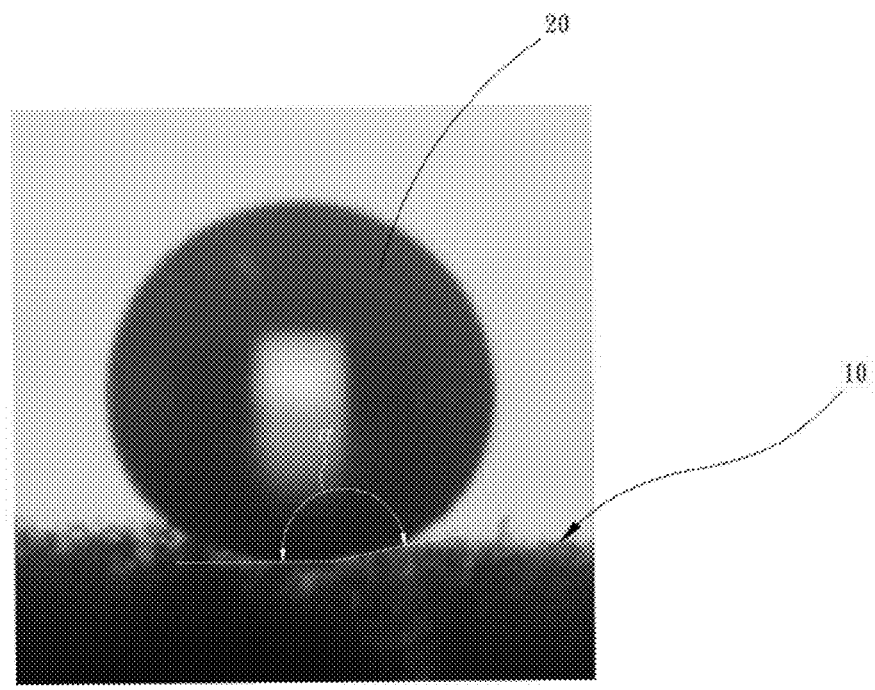
FIG. 4B shows a contact angle of water and the composite according to one embodiment of the present invention.
Figure 4C:
FIG. 4C shows a contact angle of motor oil and the composite according to one embodiment of the present invention.

Refer to FIGS. 4A-4C. FIG. 4A shows water droplets and motor oil dripped on the surface of the composite according to one embodiment of the present invention. FIG. 4B shows a contact angle of water and the composite according to one embodiment of the present invention. FIG. 4C shows a contact angle of motor oil on the composite according to one embodiment of the present invention. As shown in FIG. 4A, water droplet 20 and motor oil 30 are dripped on the surface of the composite 10 of the present invention; the water droplet 20 does not permeate into the composite 10 but forms a sphere on the surface of the composite 10; the motor oil 30 is absorbed by the composite 10. As shown in FIG. 4B, the water 20 and the surface of the composite 10 has a contact angle α of about 162 degrees. As shown in FIG. 4C, the motor oil 30 and the surface of the composite 10 has a contact angle of zero degree. The results demonstrate that the composite 10 has superior hydrophobicity and oleophilicity. The contact angle of PDMS and ordinary motor oil is about 19 degrees. The contact angle of graphene and ordinary motor oil is about 15 degrees. In one embodiment, the surface layer 12 contains the graphene sheets 122 and the adhesion medium made of PDMS. It can explain why the composite 10 has superior oleophilicity. In the present invention, the porosity of the porous material 11 has a preferred range. If the porosity is higher than the range, the interconnecting pores 112 will be too small to absorb a large amount of oil or organic pollutants. If the porosity is lower than the range, the interconnecting pores 112 will be too large to provide capillary attraction and are difficult to absorb oil or organic pollutants.

Figure 5A:
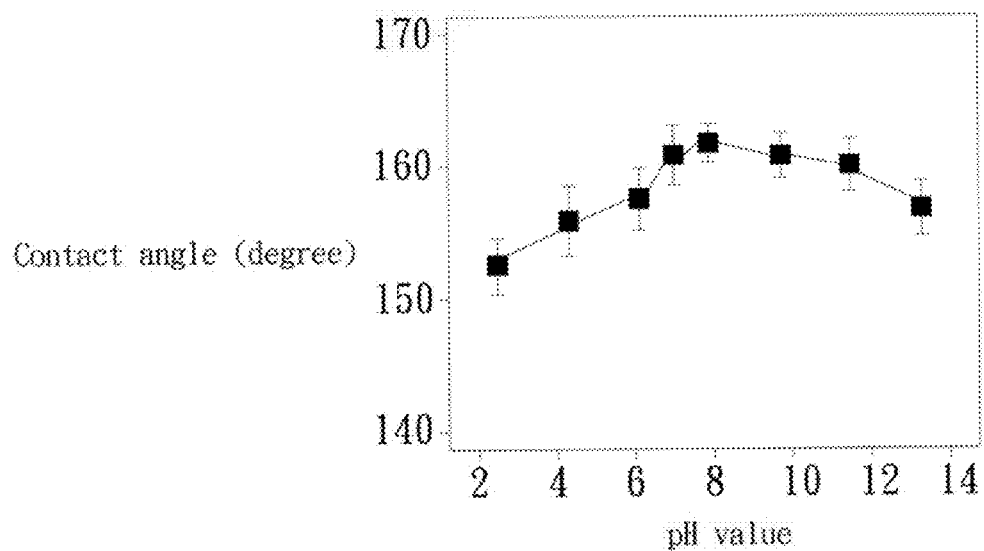
FIG. 5A shows the contact angles of the composite-aqueous solutions under various pH values of the aqueous solutions according to one embodiment of the present invention.
Figure 5B:
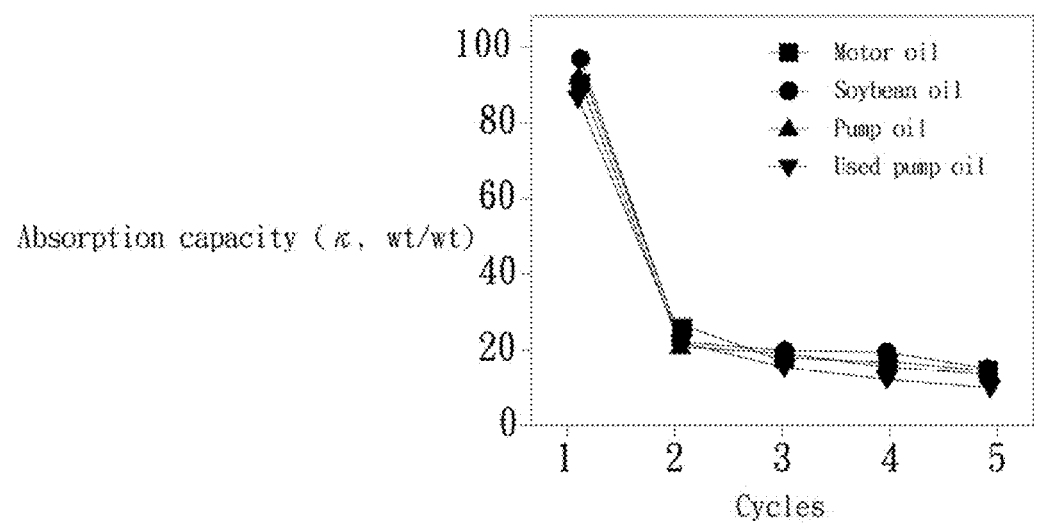
FIG. 5B shows the oil absorption capacities of the composite while reusing the composites multiple times according to one embodiment of the present invention.
Figure 5C:
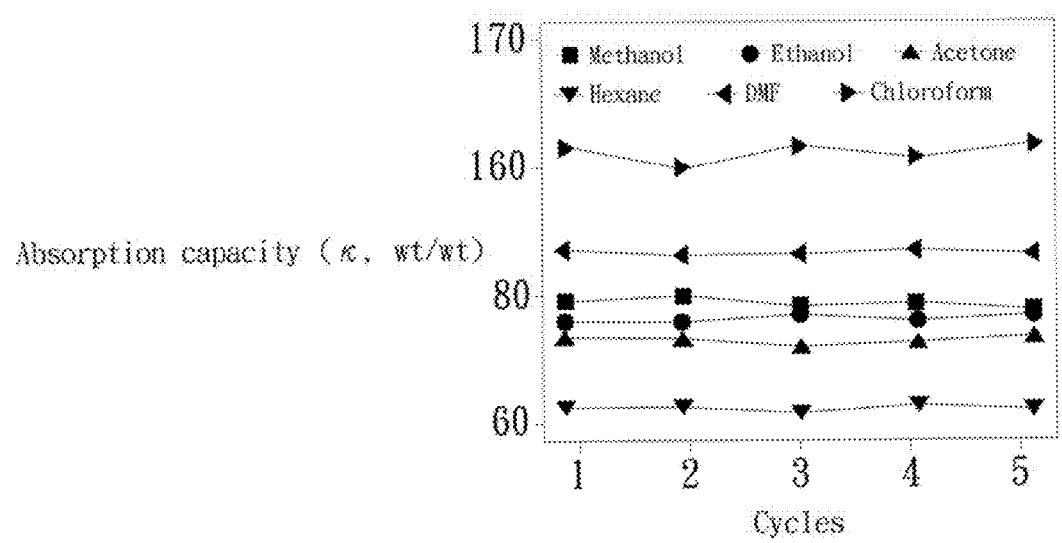
FIG. 5C shows the absorption capacities of organic pollutant of the composite while reusing the composites multiple times according to one embodiment of the present invention.

Refer to FIGS. 5A-5C. FIG. 5A shows a relationship between the contact angles of composite-aqueous solutions and the pH values of aqueous solutions according to one embodiment of the present invention. FIG. 5B shows relationships between the oil absorption capacities and the reusing times of the composite according to one embodiment of the present invention. FIG. 5C shows a relationship between the organic pollutants absorption capacities of the composite and the reusing times of the composite according to one embodiment of the present invention. FIG. 5A shows that the solutions with different pH values ranging from 2 to 14 form different contact angles between 150 and 165 degrees when contacting with the composite 10. It indicates that the hydrophobicity of the composite 10 enables the composite 10 to be applied to various aqueous environments.

FIG. 5B shows the oil absorptivity of the new and recycled composites 10. The oils in the experiments include used pump oil, pump oil, soybean oil, and motor oil. After absorbing oil, the composite 10 is squeezing-twisted to remove the absorbed oil from the composite 10. Next, the squeezed composite 10 is ready for reusing subsequently.

For understanding the performance of the superhydrophobic and superoleophilic composite of the present invention, an absorption capacity κ is defined as κ=(Ws−Wi)/Wi, wherein Ws is the weight of the composite 10 saturated with the absorbed substance, and wherein Wi is the weight of the composite 10 before each dipping. In FIG. 5B, the facts are observed that the absorption capacity κ of the composite 10 is as high as 80 at the first cycle, and that the absorption capacity κ of the composite 10 is still slightly above 20 at the second and third cycles. It indicates that the composite 10 can be recycled to absorb oil pollutants.

FIG. 5C shows the organic pollutant absorptivity of the recycled composite 10. Generally, the normal organic pollutants can be evaporated at a temperature lower than 150° C. Therefore, the absorbed organic pollutants are removed using a distillation method in the experiments. Herein, the organic pollutants are exemplified by methanol, ethanol, acetone, hexane, DMF (dimethylformamide), and chloroform. In FIG. 5C, the facts are observed that the absorption capacity κ of the composite 10 varies between 54 and 165 for different organic pollutants at the first cycle, and the absorption capacity κ of the composite 10 in the subsequent cycles remains at the same level as obtained in the first cycle. It indicates that the composite 10 can be recycled to absorb organic pollutants.

In the embodiments described above, the composite 10 is used to absorb organic pollutants, such as methanol, ethanol, acetone, hexane, DMF and chloroform, and to absorb oil pollutants, such as crude oil, used pump oil, pump oil, soybean oil and motor oil. However, the composite of the present invention is not limited to absorb the abovementioned pollutants but can be further used to absorb other oil or organic pollutants, such as octane, decane, dodecane, vegetable oil, gasoline, petroleum ether, diesel oil, transformer oil, lubricating oil, etc.

In the present invention, the surface layer is coated on the skeletons of the porous material to provide superhydrophobicity and superoleophilicity of the composite and enable the composite to absorb oil and organic pollutants in water. The absorption capacity of the composite reaches over 80 in the first cycle of oil pollutant absorption and varies between 54 and 165 at the first cycle of organic pollutant absorption. The composite can be reused after expelling the absorbed oil or organic pollutants via the squeezing-twisting, the distillation, or the centrifugal method. Furthermore, the composite of the present invention is low-cost because it can be mass-fabricated in a simple process. Therefore, the present invention possesses utility, novelty and non-obviousness and meets the condition for a patent. Thus, the inventor files the application for a patent. It is appreciated if the patent can be approved fast.

The present invention has been described in detail with the embodiments. However, these embodiments are only to exemplify the present invention but not to limit the scope of the present invention. Any equivalent modification or variation according to the spirit of the present invention is to be also included within the scope of the present invention.

What is claimed is:

1. A superhydrophobic and superoleophilic composite, comprising
    a porous material including a framework which contains a plurality of skeletons connected with each other and a plurality of interconnecting pores separated by the skeletons; and
    a surface layer coated on surfaces of the plurality of skeletons, the surface layer including an adhesion medium and a plurality of graphene sheets stuck to the surfaces of the plurality of skeletons by the adhesion medium,
    wherein the plurality of graphene sheets form a rough surface conforming to the plurality of skeletons.

2. The superhydrophobic and superoleophilic composite according to claim 1, wherein a contact angle of 150-170 degrees exists between water and the composite.

3. The superhydrophobic and superoleophilic composite according to claim 1, wherein a contact angle of 0-10 degrees exists between oil and the composite.

4. The superhydrophobic and superoleophilic composite according to claim 1, wherein the adhesion medium is made of a material selected from a group consisting of PDMS, Teflon, sulfonated polystyrene, nafion, polystyrene, PE (polyethylene), PP (polypropylene), FEP (fluorinated ethylene propylene), PIB (polyisobutylene), PtBMA (poly t-butyl methacrylate).

5. The superhydrophobic and superoleophilic composite according to claim 1, wherein the weight of the plurality of graphene sheets is 5-10% of the initial weight of the porous material.

6. The superhydrophobic and superoleophilic composite according to claim 1, wherein the plurality of interconnecting pores have a diameter ranging from 50 to 200 μm.

7. The superhydrophobic and superoleophilic composite according to claim 1, wherein the graphene sheets have a thickness ranging from 0.5 to 5.0 nm.

8. The superhydrophobic and superoleophilic composite according to claim 1, wherein the graphene sheets have a lateral size ranging from 0.15 to 10.0 □m.

9. The superhydrophobic and superoleophilic composite according to claim 1, wherein the porous material is made of a material selected from a group consisting of lignocellulose, cellulose, foamed polymers, polyether, polyvinyl alcohol, melamine, polyurethane, and polyester.

10. The superhydrophobic and superoleophilic composite according to claim 1, wherein the porous material has a sponge-like structure.

* * * * *